(12) United States Patent
Fregene et al.

(10) Patent No.: US 7,970,507 B2
(45) Date of Patent: Jun. 28, 2011

(54) METHOD AND SYSTEM FOR AUTONOMOUS TRACKING OF A MOBILE TARGET BY AN UNMANNED AERIAL VEHICLE

(75) Inventors: Kingsley O C Fregene, Andover, MN (US); Peter Lommel, St. Cloud, MN (US)

(73) Assignee: Honeywell International Inc., Morristown, NJ (US)

( * ) Notice: Subject to any disclaimer, the term of this patent is extended or adjusted under 35 U.S.C. 154(b) by 805 days.

(21) Appl. No.: 12/018,669

(22) Filed: Jan. 23, 2008

(65) Prior Publication Data

US 2009/0187299 A1    Jul. 23, 2009

(51) Int. Cl.
*G01C 22/00* (2006.01)
(52) U.S. Cl. ............. 701/23; 701/14; 701/206; 342/36; 340/948; 340/961
(58) Field of Classification Search ............ 701/14, 701/16, 23, 29, 35, 117, 120, 301, 206; 340/961, 340/945, 948; 342/29, 33, 34, 35, 36
See application file for complete search history.

(56) References Cited

U.S. PATENT DOCUMENTS

| 6,910,657 | B2 | 6/2005 | Schneider | |
| 7,307,579 | B2 | 12/2007 | Rees et al. | |
| 7,437,225 | B1 * | 10/2008 | Rathinam | 701/14 |
| 2003/0212478 | A1 * | 11/2003 | Rios | 701/2 |
| 2007/0093945 | A1 | 4/2007 | Grzywna et al. | |
| 2007/0250260 | A1 | 10/2007 | Ariyur et al. | |
| 2007/0268364 | A1 | 11/2007 | Neff et al. | |
| 2009/0015674 | A1 * | 1/2009 | Alley et al. | 348/144 |

OTHER PUBLICATIONS

Jusuk Lee etl al, Strategies of Path-Planning for a UAV to Track a Ground Vehicle, AINS, Menlo Park, CA, Jun. 2003.

* cited by examiner

*Primary Examiner* — Gertrude Arthur Jeanglaud
(74) *Attorney, Agent, or Firm* — Fogg & Powers LLC

(57) ABSTRACT

This invention provides a system and method for autonomously tracking a moving target from unmanned aerial vehicles (UAVs) with a variety of airframe and sensor payload capabilities so that the target remains within the vehicle's sensor field of view regardless of the specific target motion patterns. The invention uses information about target location, UAV platform type and states, sensor payload capability, and ratio of target-to-UAV speeds to select from a suite of sub-algorithms, each of which generates desired platform positions (in form of waypoints) and/or sensor orientation commands to keep the target in view.

20 Claims, 6 Drawing Sheets

US 7,970,507 B2

METHOD AND SYSTEM FOR AUTONOMOUS TRACKING OF A MOBILE TARGET BY AN UNMANNED AERIAL VEHICLE

GOVERNMENT LICENSE RIGHTS

The U.S. Government may have certain rights in the present invention as provided for by the terms of Contract No. FA8650-04-C-7142 with the Defense Advanced Research Projects Agency.

BACKGROUND TECHNOLOGY

Unmanned aerial vehicles (UAVs) are remotely piloted or self-piloted aircraft that can carry cameras, sensors, communications equipment, or other payloads. They have been used in a reconnaissance and intelligence-gathering role for many years. More recently, UAVs have been developed for the purpose of surveillance and target tracking.

Autonomous surveillance and target tracking performed by UAVs in either military or civilian environments is becoming an important aspect of intelligence-gathering. Typically, when a target is being tracked from aerial vehicles (e.g. a UAV), human operators must closely monitor imagery streamed from the aircraft to assess target behavior and ensure that the target continues to be in view.

SUMMARY

This invention provides a system and method for autonomously tracking a moving target from UAVs with a variety of airframe and sensor payload capabilities so that the target remains within the vehicle's sensor field of view regardless of the specific target motion patterns. The invention uses information about target location, UAV platform type and states, sensor payload capability, and ratio of target-to-UAV speeds to select from a suite of sub-algorithms, each of which generates desired platform positions (in form of waypoints) and/or sensor orientation commands to keep the target in view.

BRIEF DESCRIPTION OF THE DRAWINGS

Features of the present invention will become apparent to those skilled in the art from the following description with reference to the drawings. Understanding that the drawings depict only typical embodiments of the invention and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the present invention. The following detailed description is, therefore, not to be taken in a limiting sense.

Figure 1:
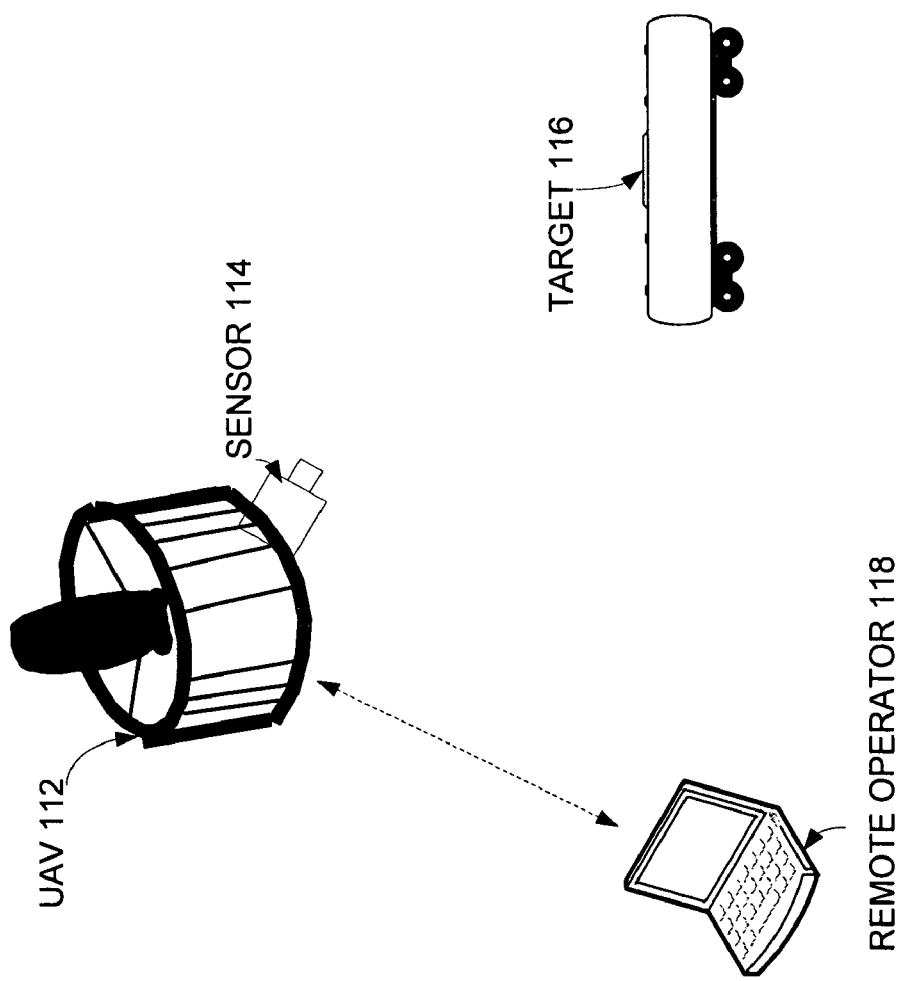
FIG. 1 is a schematic diagram depicting a system for aerial tracking of a ground vehicle according to one embodiment of the invention.

FIG. 1 is a simplified diagram depicting a system 100 for automatically tracking a target from a UAV. As shown in FIG. 1, the system includes (1) a UAV 112 equipped with at least one sensor 114, (3) a target 116 and (4) a remote operator 118. It should be understood that while remote operator 118 is shown in FIG. 1, remote operator 118 may be many miles away from UAV 112 and target 116.

The UAV 112 can either be a hover-capable aerial vehicle or a fixed-wing aerial vehicle. Sensor 114 may be any device capable of imaging a target, such as a camera or radar. Target 116 may be anything being monitored by UAV 112. For example, target 116 may be a ground-based vehicle, an air-based vehicle, a roadway, or a person. To acquire a target, UAV 112 typically sends images from sensor 114 to remote operator 118. Remote operator 118 then defines an area in the image as the target, and sends the target to UAV 112.

Remote operator 118 may be any device capable of communicating with UAV 112. In addition, remote operator 118 may be configured to remotely control UAV 112. Remote operator 118 may be a device such as a desktop computer, laptop, or a personal data assistant ("PDA"), for example.

Figure 2:
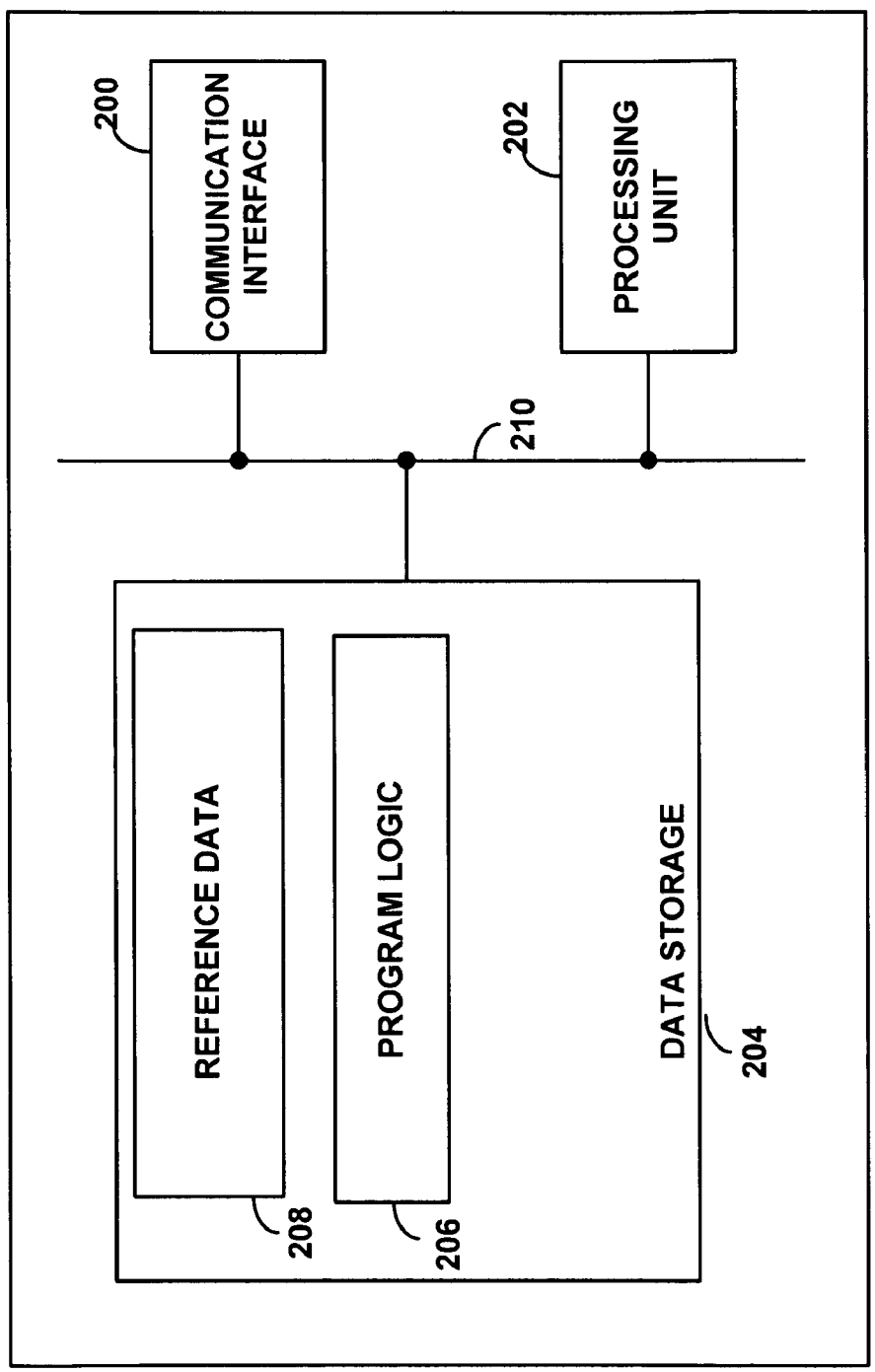
FIG. 2 is a simplified block diagram of an entity arranged to implement aspects of the exemplary embodiment.

Aspects of the present invention may be carried out by UAV 112 and/or remote operator 118 (or any other entity capable of controlling UAV 112). FIG. 2 depicts functional components that may be included in UAV 112 and/or remote operator 118 to carry out various aspects of the invention. As shown in FIG. 2, the components include a communication interface 200, a processing unit 202, and data storage 206, all of which may be coupled together by a system bus, network, or other mechanism 210.

Communication interface 200 comprises a mechanism for communicating over an air interface, so as to facilitate communication between UAV 112 and remote operator 118. Further, communication interface 200 may include one or more antennas to facilitate air interface communication.

Processing unit 202 comprises one or more general purpose processors (e.g., INTEL microprocessors) and/or one or more special purpose processors (e.g., digital signal processors). Data storage 204, in turn, comprises one or more volatile and/or non-volatile storage mechanisms, such as memory and/or disc-drive storage for instance, which may be integrated in whole or in part with processing unit 202.

As shown, data storage 204 includes program logic 206 and reference data 208. Program logic 206 comprises one or more logic modules (applications), and preferably includes machine language instructions executable by processing unit 204 to carry out various functions described herein, such as (1) identifying the coordinates of the footprint of sensor 114, (2) determining whether the target is close to leaving the field of view of the sensor, and (3) causing UAV 112 to fly in a track mode that keeps target 116 in the field of view of sensor 114. Reference data 208, in turn, may include data such as imaging data acquired by sensor 114.

Figure 3:
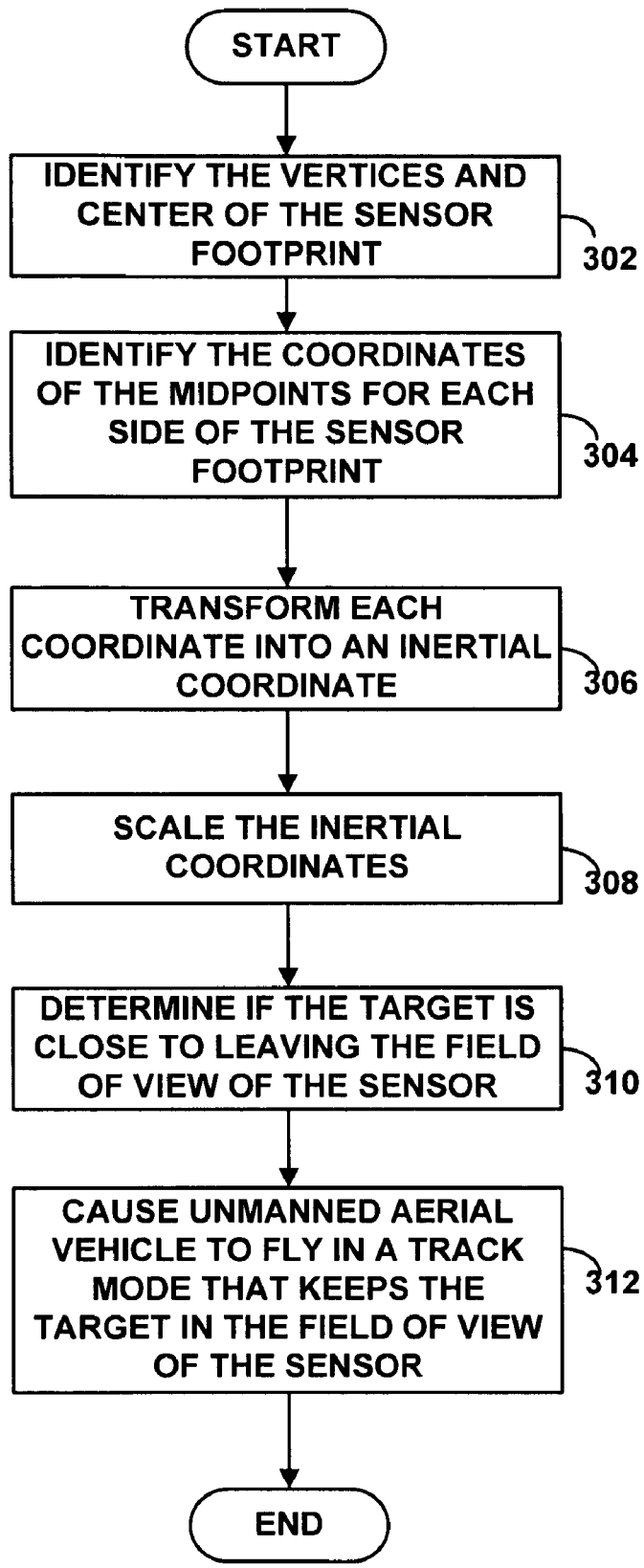
FIG. 3 is a flow chart depicting functions that can be carried out in accordance with the exemplary embodiment.

FIG. 3 is a flow chart depicting identifying various coordinates in a sensor footprint used to autonomously track target 116. In particular, FIG. 3 depicts (1) identifying the coordinates of the footprint of sensor 114, (2) determining whether the target is close to leaving the field of view of the sensor, and (3) causing UAV 112 to fly in a track mode that keeps target 116 in the field of view of sensor 114.

Figure 4:
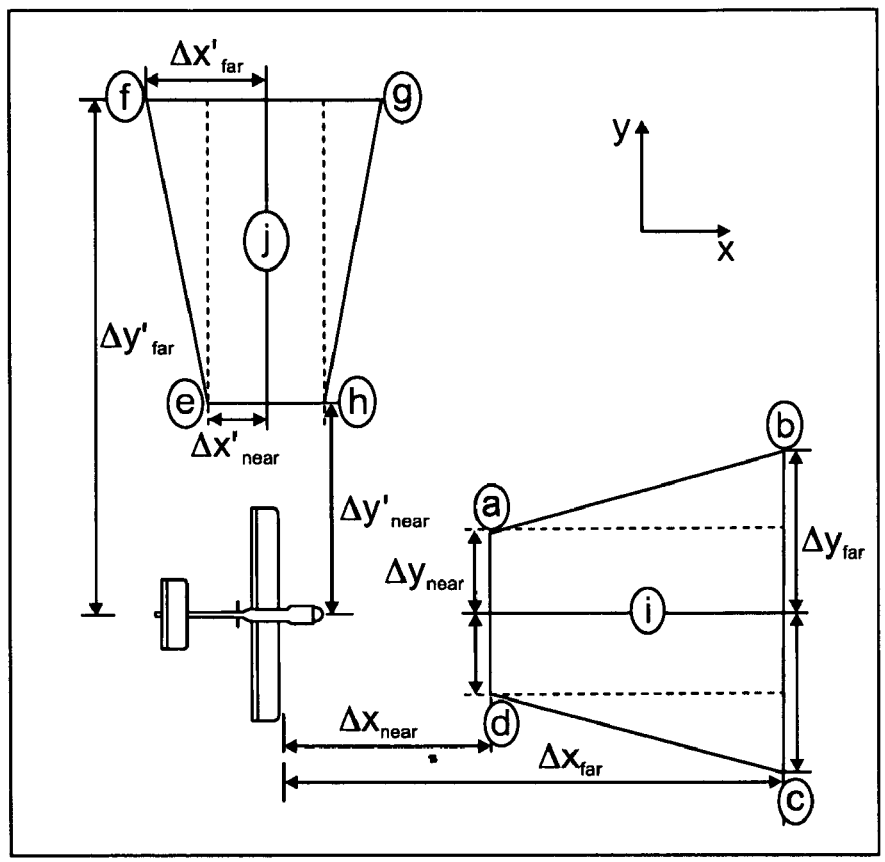
FIG. 4 is a diagram depicting an example of a sensor footprint.

As shown in FIG. 3, at step 302, UAV 112 identifies the coordinates of the vertices and center of the footprint (i.e., the viewing window) of sensor 114. Examples of sensor footprints are depicted in FIG. 4. As shown in FIG. 4, UAV 112 is equipped with forward and side looking sensors. Forward looking sensor footprint 402 includes vertices {a, b, c, d}. The center of footprint 402 is identified as {i}. Side-looking sensor footprint 404 includes vertices {e, f, g, h}. The center of side-looking sensor footprint is identified as {j}.

Figure 8:
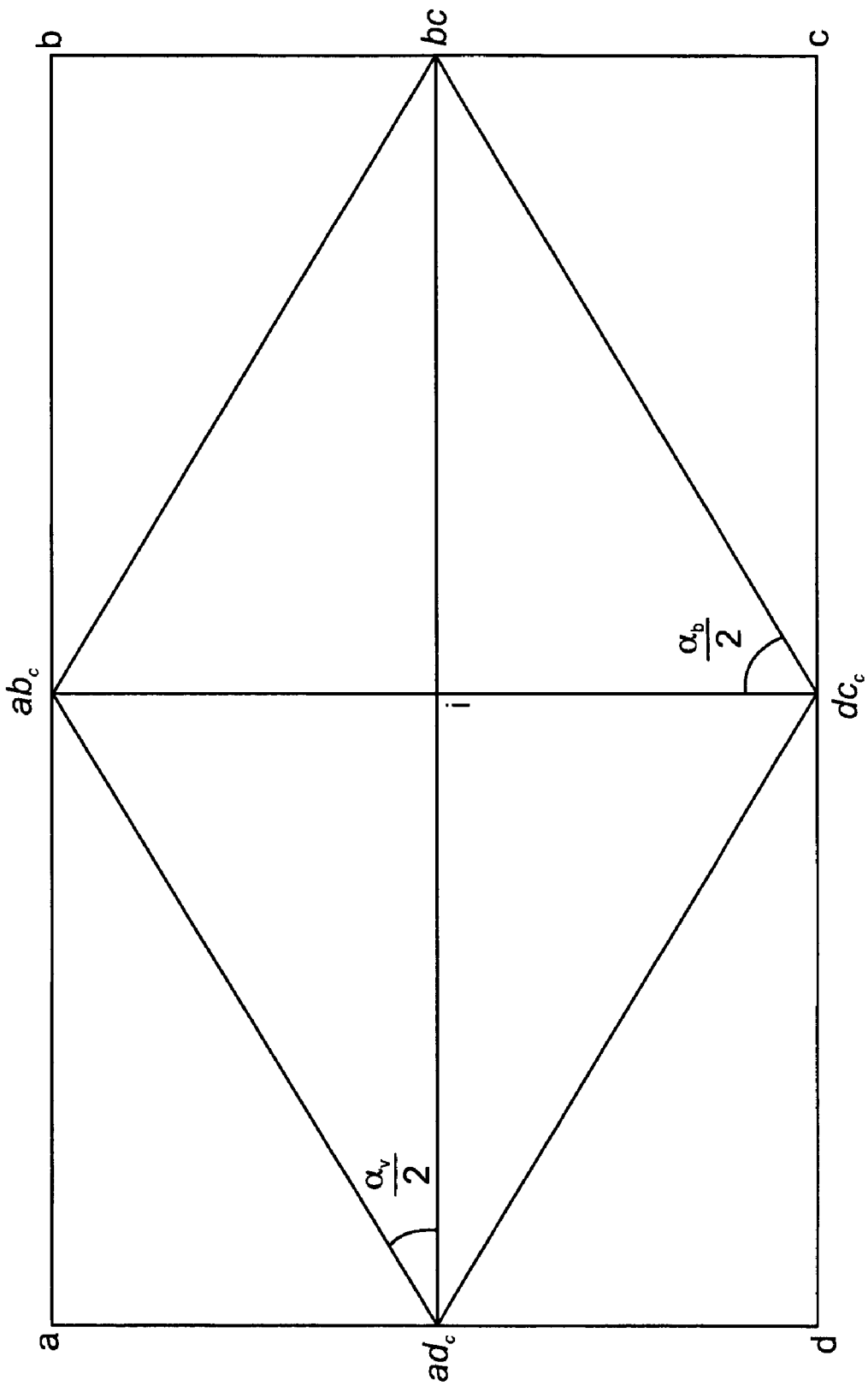
FIG. 8 depicts a forward-looking sensor footprint that has been normalized.

FIG. 8 depicts a forward-looking sensor footprint that has been normalized (i.e., displayed as a rectangle). As shown in FIG. 8, the footprint includes vertices {a, b, c, d}, center {i}, midpoints {$ad_c$, $ab_c$, $bc_c$, $dc_c$}, and angles $$\{\frac{\alpha_v}{2}, \frac{\alpha_h}{2}\},$$

where $\alpha_h$ and $\alpha_v$ are the horizontal and vertical field of view angles for sensor 114.

Returning to FIG. 3, the coordinates of the vertices and center of the sensor footprint may be computed using the following data:

[$\alpha_h$, $\alpha_v$], the horizontal and vertical field of view for sensor 114;

[$\theta$, $\phi$, $\psi$], the attitude angles of UAV 112, where $\theta$, is the pitch, $\phi$ is the roll, and $\psi$ is the yaw. In this example climb requires a positive pitch, the right wing down is a positive roll and clockwise from the top of the vehicle is a positive yaw;

[$\theta_c$, $\phi_c$, $\psi_c$], the attitude angles of sensor 114, where $\theta$, is the pitch, $\phi$ is the roll, and $\psi$ is the yaw. In this example, pitch is measured between 0 and 90 degrees measured from straight down. The Camera lookdown angle is $(1-\theta_c)$, the roll angle is positive right and the yaw angle is positive in the clockwise direction. Consequently, a forward facing sensor 114 has $\psi_c$=0, while a left-pointing camera has a $\psi_c$=−90 degrees; and

[N, E, h], the position coordinates of UAV 112 where N=north, E=east, and h=height from some reference point (such as UTM northings, eastings and altitude).

The local coordinates of the vertices and center of the footprint are identified as follows:

$$\begin{bmatrix} a \\ b \\ c \\ d \\ i \end{bmatrix} = \begin{bmatrix} \tan(\frac{\alpha_v}{2}) & -\tan(\frac{\alpha_h}{2}) & 1 \\ \tan(\frac{\alpha_v}{2}) & \tan(\frac{\alpha_h}{2}) & 1 \\ -\tan(\frac{\alpha_v}{2}) & \tan(\frac{\alpha_h}{2}) & 1 \\ -\tan(\frac{\alpha_v}{2}) & -\tan(\frac{\alpha_h}{2}) & 1 \\ 0 & 0 & 1 \end{bmatrix}$$

At step 304, the local coordinates of the midpoints for each side of the sensor footprint are identified as follows:

$$\begin{bmatrix} ab_c \\ bc_c \\ dc_c \\ ad_c \end{bmatrix} = \begin{bmatrix} \tan(\alpha_v/2) & 0 & 1 \\ 0 & \tan(\alpha_h/2) & 1 \\ -\tan(\alpha_v/2) & 0 & 1 \\ 0 & -\tan(\alpha_h/2) & 1 \end{bmatrix}$$

At step 306, the radii of the ellipse that circumscribes the frame is identified as follows:

$$r_h = \tan\frac{\alpha_h}{2}$$

$$r_v = \tan\frac{\alpha_v}{2}$$

where $r_h$ is the radius in the horizontal direction and $r_v$ is the radius in the vertical direction. The smaller of these two radii corresponds to the length of the semi-minor axis of the ellipse.

At step 308, each coordinate is transformed to inertial coordinates my multiplying the coordinate by pitch-roll-yaw rotation matrices [R] and [$R_c$], where $[R]=[R(\theta)][R(\phi)][R(\psi)]$; and $[R_c]=[R(\theta_c)][R(\phi_c)][R(\psi_c)]$.

Thus, $A=a[R][R_c]$ $B=b[R][R_c]$ $C=c[R][R_c]$ $D=d[R][R_c]$ $I=i[R][R_c]$ $AB_c=ab_c[R][R_c]$ $BC_c=bc_c[R][R_c]$ $DC_c=dc_c[R][R_c]$ $AD_c=ad_c[R][R_c]$ Rotational matrices are well known in the art, and are not described in detail here.

At step 310 the scaled coordinates of the sensor footprint are computed by scaling the inertial coordinates by the height (h) that UAV 112 is flying above the ground (if target 116 is a ground target), or the height of UAV 112 is flying above the target 116 (if target 116 is not necessarily on the ground). The footprint is calculated as follows:

$$A_g = A \times \frac{h}{A(3)}$$

$$B_g = B \times \frac{h}{B(3)}$$

$$C_g = C \times \frac{h}{C(3)}$$

$$D_g = D \times \frac{h}{D(3)}$$

$$I_g = I \times \frac{h}{I(3)}$$

$$AB_{cg} = AB_c \times \frac{h}{AB_c(3)}$$

$$BC_{cg} = BC_c \times \frac{h}{BC_c(3)}$$

$$DC_{cg} = DC_c \times \frac{h}{DC_c(3)}$$

$$AD_{cg} = AD_c \times \frac{h}{AD_c(3)}$$

Similarly, the length of the semi-minor axis may be scaled to account for the height UAV 112 is above target 116:

$$r_{SM} = \min(r_h, r_v) \times \frac{h}{I(3)}$$

Figure 5:
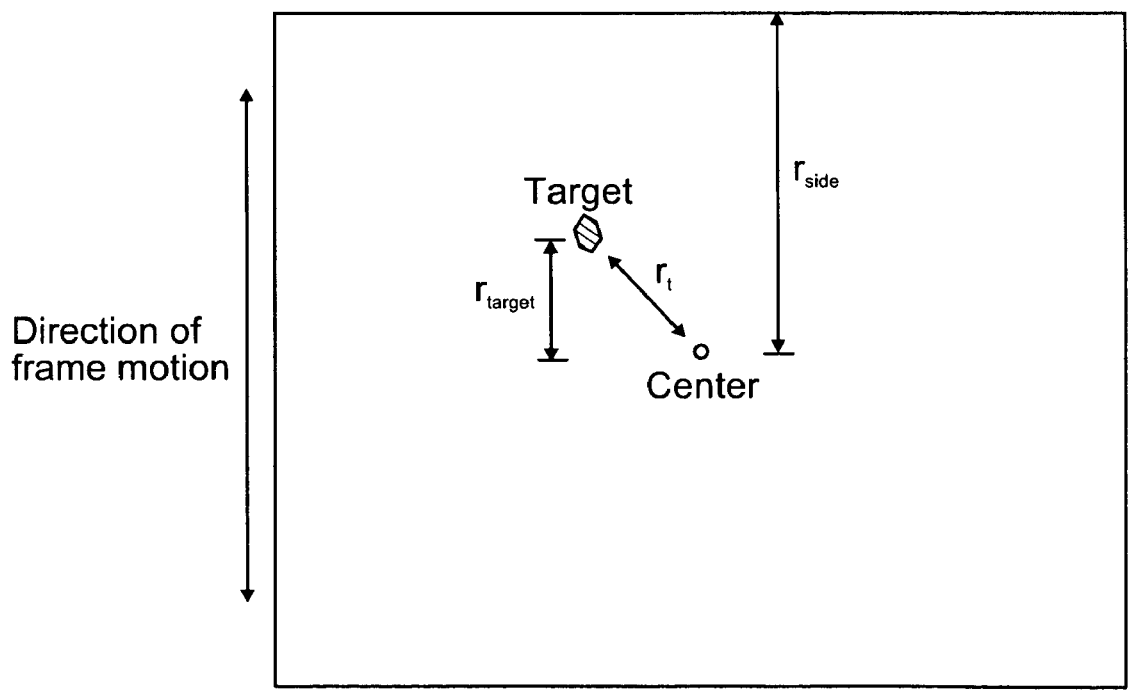
FIG. 5 is a diagram of a footprint that illustrates variables needed to determine how close target 116 is from leaving sensor 114's field of view.

After computing the various coordinates of sensor 114's sensor footprint, at step 310, the target's (1) position relative to the center of the camera footprint ($r_{target}$) on the ground, (2) the distance from the center of the camera footprint to the side (e.g., [$AB_{cg} BC_{cg} DC_{cg} AD_{cg}$] of the footprint that is closest to the target ($r_{side}$), and (3) the distance from the center of the frame to the target ($r_t$) are used to determine how close target 116 is from leaving sensor 114's field of view. These positions are illustrated in FIG. 5, which is a diagram of a footprint that illustrates variables need to determine how close target 116 is from leaving sensor 114's field of view. As shown in FIG. 5, the frame includes a center point, a target, $r_{target}$, $r_t$, $r_{side}$, and the direction of the frame of motion.

In order to determine whether the target is about to leave the target's field of view, the value of $r_{target}$ and $r_{side}$ is first calculated. $r_{target}$ is calculated by using the following equation:

$$r_{target} = (\hat{e}_{ct} \cdot \hat{e}_{ce}) r_t$$

where $\hat{e}_{ct}$ and $\hat{e}_{ce}$ are unit vectors along a line from the target to the center of the footprint and from the mid-point of the closest side to the center respectively. That is, $\hat{e}_{ct}$ is the unit vector along $r_t$, while $\hat{e}_{ce}$ is the unit vector along $r_{side}$.

$r_{side}$ is calculated using the following equation:

$$r_{side} = \mathrm{argmin} \begin{Vmatrix} r_{AB_{cg}} - r_{target} \\ r_{BC_{cg}} - r_{target} \\ r_{DC_{cg}} - r_{target} \\ r_{AD_{cg}} - r_{target} \end{Vmatrix}$$

where $r_{AB_{cg}}$-$r_{AD_{cg}}$ is the distance from the center of the frame to the side of the frame.

By calculating these values over time, UAV 112 (or remote operator 118) can determine if and when target 118 will leave the field of view of sensor 114.

At step 312 the location and speed of target 116 are used to cause UAV 112 to, depending on how fast target 116 is moving relative to the speed UAV 112 is capable of flying, fly in different track modes. These modes include, all at suitable altitude and stand-off ranges, (1) a straight following of the target (SFO), (2) flying orbits around the target (ORB), or (3) doing S-shapes (i.e. sinusoids) (SIN). This enables UAV 112 to maintain target 116 in the sensor footprint of sensor 114. UAV 112 flies in these modes by receiving waypoint commands and flying to the waypoints.

To determine which tracking mode UAV should use, the ratio ($\sigma$) of the speed of UAV 112 ($v_p$) to the speed of target 114 ($v_t$) is identified:

$$\sigma = \frac{v_p}{v_t}$$

If $\sigma$ is around 1, UAV 112 and target 114 are traveling at similar speeds, and UAV 112 should employ SFO tracking. If $\sigma$ is greater than 1 (i.e., is travelling faster than target 114), UAV 112 can slow down to match the speed of target 114 and maintain SFO tracking. However, if UAV 112 is unable to travel at such a slow speed (because it would stall), UAV 112 should employ either SIN or ORB tracking. Consequently, UAV 112 should employ SIN tracking. If UAV 112 would be unable to maintain the target in its sensor footprint using SIN tracking (i.e., the amplitude required is too large), then UAV 112 should employ ORB tracking. The value of $\sigma$ that triggers UAV 112 to engage in a different mode is aircraft specific, as different aircraft have different properties (such as being a hovercraft vs. a fixed-wing aircraft). UAV 112 may automatically switch track modes depending on the value of $\sigma$, or may be instructed by remote entity 118 to enter a different track mode depending on the value of $\sigma$.

SFO Tracking

If UAV 112 is flying in the SFO track mode, the waypoint ($WPT_{SFO}$) is calculated as follows:

$$WPT_{SFO} = \mathrm{tgtPosn} - I_g$$

Where tgtPosn is the target's position in the inertial frame, and $I_g$ (calculated above) is the offset between the aircraft and the center of the footprint.

SIN Tracking

Figure 6:
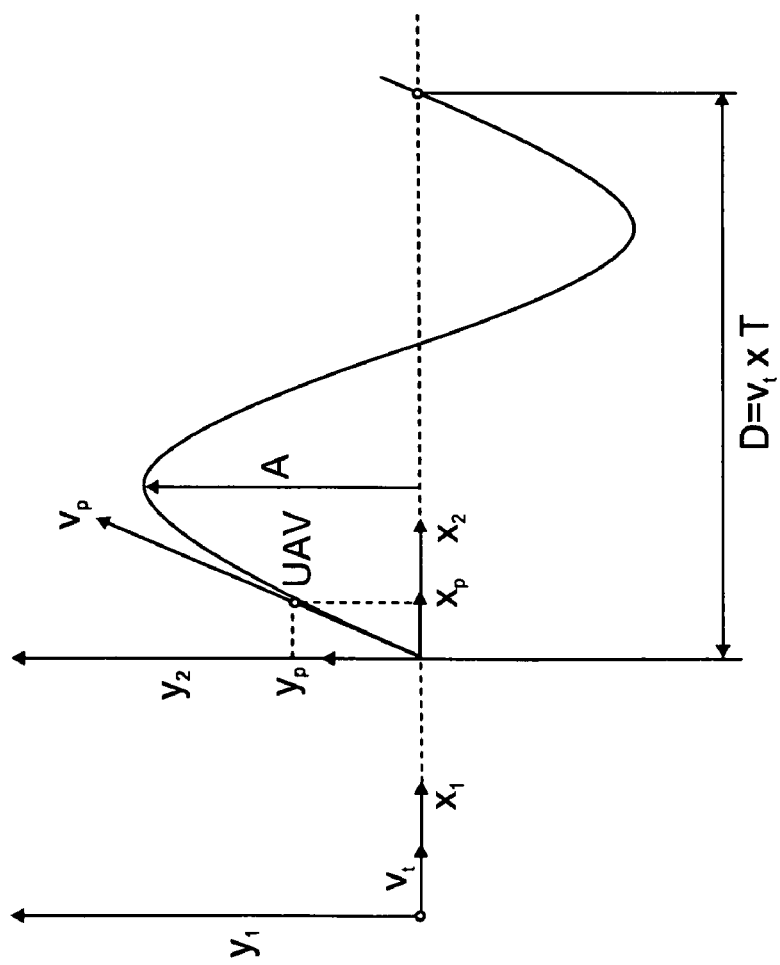
FIG. 6 is a diagram depicting SIN tracking.

FIG. 6 is an illustration depicting the variables used to calculate waypoints for SIN tracking. As shown in FIG. 6, UAV 112 is traveling at a fixed airspeed $v_p$, and is tracking target 116. Target 116 is moving along a straight line with a speed $v_t$. In addition, a pair of aligned coordinate systems is shown. One system ($x_1, y_1$) is fixed to the target, and the other ($x_2, y_2$) is fixed to the beginning of the sinusoid. In order for UAV 112 to maintain track of target 116, the distance (D) that UAV 112 travels in one period (J) is equal to the distance traveled by the target in the same direction:

$$D = v_t \times T$$

The period is a free parameter that may be selected as desired. However, longer periods are more desirable because it decreases the size of the amplitude (A), making it easier for UAV 112 to track target 116. The amplitude is determined by considering which direction of the footprint displacement and the distance from the target to the mid-point of the closest side of the footprint:

$$A = k_{tr} |r_{side} - r_{target}|$$

where $r_{side}$ and $r_{target}$ were calculated above, and $k_{tr}$ is a parameter used to tune the sensitivity of the algorithm. $k_{tr}$ greater than zero and less than or equal to one and is a multiplicative factor based on the distance from the target to the closest side of the footprint. Generally $$k_{tr} = 1 - \frac{r_{target}}{r_{side}},$$

although other values may be used.

($x_p, y_p$) is the desired position of UAV 112 in the $x_2, y_2$ coordinate system:

$$y_p = A \sin\left(\frac{2\pi x_p}{D}\right)$$

and $$\dot{y}_p = A' \cos\left(\frac{2\pi x_p}{D}\right) \cdot \dot{x}_p$$

where $A' = \frac{2\pi A}{D}$, and $$\dot{x}_p = \frac{v_p}{\sqrt{1 + A'^2 \cos^2\left(\frac{2\pi x_p}{D}\right)}}$$

The waypoints (WPT$_{SIN}$) for UAV 112 when it is operating in SIN track mode are calculated as follows:

$$WPT_{SIN} = [R(\psi_{tgt})] \int \begin{bmatrix} \dot{x}_p \\ \dot{y}_p \end{bmatrix} dt - I_g$$

where ($\psi_{tgt}$) is the target's heading and $\lfloor R(\psi_{tgt}) \rfloor$ is the rotation matrix that transforms $x_p$ and $y_p$ back into the inertial frame.

ORB Tracking

ORB tracking enables UAV 112 to loiter over target 116. The orbiting track waypoints (WPT$_{ORB}$) are given in N, E, h (north, east, height), and are calculated for a UAV having inertial coordinates $N_c$ and $E_c$ as follows:

$$WPT_{ORB} = \begin{pmatrix} N_t & E_t & h \\ N_t + r_c \sin\beta & E_t + r_c \cos\beta & h \\ N_t + r_c & E_t & h \\ N_t + r_c \sin\beta & E_t - r_c \cos\beta & h \\ N_t & E_t - r_c & h \\ N_t - r_c \sin\beta & E_t - r_c \cos\beta & h \\ N_t - r_c & E_t & h \\ N_t - r_c \sin\beta & E_t + r_c \cos\beta & h \end{pmatrix}$$

where ($N_t$, $E_t$) is the position of target 116, $r_c = \sqrt{N_c^2 + E_c^2}$, and $\beta$ is an angle dependent on how many waypoints you want to produce, and where waypoints should be relative to the target. For example, if there are 12 waypoints for UAV 112 to visit, $$\beta = \frac{\pi}{6}.$$

It should be understood that the first row of the WPT$_{ORB}$ is not necessarily the first waypoint visited by UAV 112. Instead, a cost function may be utilized that determines the order in which waypoints are visited by UAV 112. The cost function uses the range to all the waypoints and the required change in heading needed for UAV 112 to get to each waypoint.

In addition, the position of the orbital waypoints relative to the target's frame of motion may be adjusted in order to achieve acceptable tracking performance at smaller speed ratios (higher target speeds). This results in "stretching" UAV 112's orbit ahead of target 116 and can reduce the amount that UAV 112 falls behind.

Figure 7:
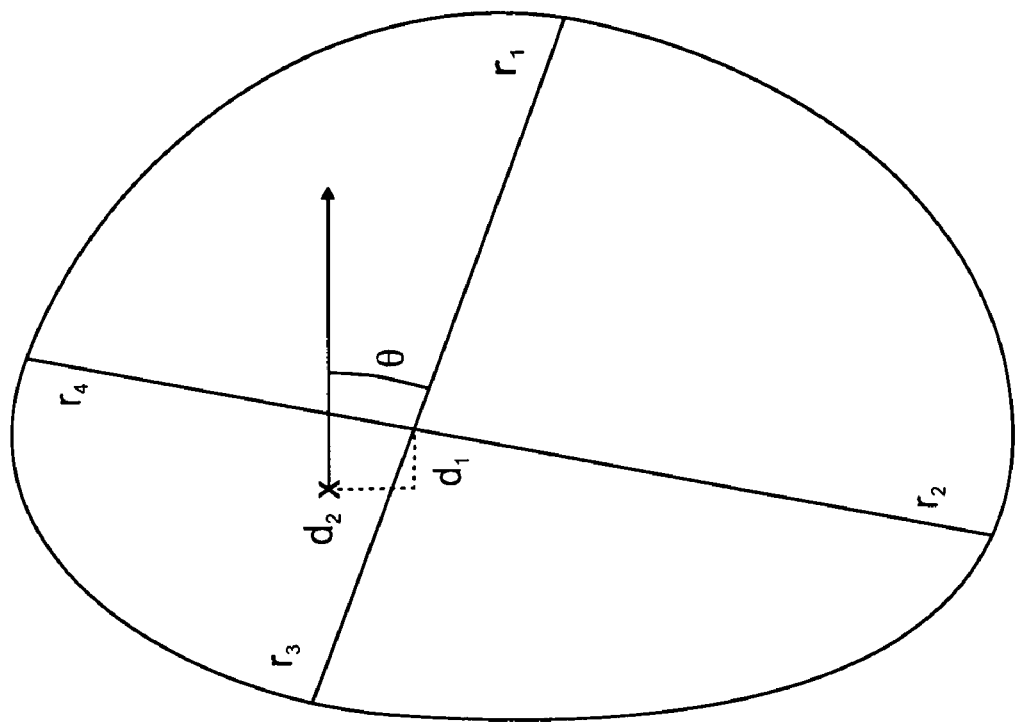
FIG. 7 is an illustration depicting the parameters for adjusting the loitering orbit when target 116 is in motion.

FIG. 7 is an illustration depicting the parameters for adjusting the loitering orbit when target 116 is in motion. As shown in FIG. 6, the seven parameters include radii $r_1$-$r_4$, diameters $d_1$ and $d_2$, angle $\theta$, which is the angle between the motion of the target and $d_1$. The shape of the orbit is adjusted by separating the circular orbit into four arcs (quarter-circles). Each arc is described by an elliptic section, constrained at their connection points. This is achieved by specifying the length of the four "halfaxes" of the elliptic sections. The circular sections are then special cases of the elliptic sections in which the length of all of the half-axes are equivalent. Additionally, the principal axes of the elliptic sections may be rotated and the center of the orbit may be displaced from the target position. These seven parameters can be computed analytically or chosen using numerical optimization techniques and stored in a look-up table as a function of the speed ratio. For generality, the piecewise elliptical orbit is also normalized. That is, the orbit is defined relative to a unit circle orbit and during application the actual radius of the circular orbit is used to scale the piecewise elliptical orbit.

Once the piecewise elliptical orbit parameters have been chosen, a modified waypoint can be calculated as follows:

$$WPT'_{ORB} = \text{tgtPosn} + r_{norm} \times \text{offset}(\text{tgtVel}) + \alpha(WPT_{ORB}, \text{tgtPosn}, \text{tgtVel}) \times (WPT_{ORB} - \text{tgtPosn})$$

where tgtPosn is the position of target 116 in the inertial frame, tgtVel is the velocity of target 116 in the inertial frame, $r_{norm}$ is the radius of the nominal (circular) orbit, and:

$$\text{offset}(tgtVel) = d_1(tgtVel)\hat{v} + d_2(tgtVel)\hat{n}$$

$$\hat{v} = \frac{tgtVel}{\|tgtVel\|}$$

$$\hat{n} = \begin{bmatrix} 0 & 1 \\ -1 & 0 \end{bmatrix} \hat{v}$$

The scale factor, $\alpha$, is computed using the equation of an ellipse. The principal axes of the ellipse are defined as follows:

$$p_a = \cos(\theta)\hat{v} + \sin(\theta)\hat{n}$$

$$p_b = -\sin(\theta)\hat{v} + \cos(\theta)\hat{n}$$

The lengths of the axes are defined as follows:

$$r_a = \begin{cases} r_1 & \text{if } \hat{w} \cdot p_a > 0 \\ r_3 & \text{otherwise} \end{cases}$$

$$r_b = \begin{cases} r_2 & \text{if } \hat{w} \cdot p_b > 0 \\ r_4 & \text{otherwise} \end{cases}$$

$$\hat{w} = \frac{(WPT_{ORB} - tgtPosn)}{\|(WPT_{ORB} - tgtPosn)\|}$$

The equation of the ellipse is:

$$x^T M x = 1$$

$$M = YY^T$$

$$Y = \begin{bmatrix} \frac{p_a}{r_a} & \frac{p_b}{r_b} \end{bmatrix}$$

$\alpha$ is the scalar multiplier such that $\alpha\hat{w}$ lies on the ellipse, $\alpha$ may be computed by plugging $x = \alpha\hat{w}$ into the equation $x^T M x = 1$. Thus:

$$\alpha = \left(\frac{1}{\hat{w}^T M \hat{w}}\right)^{\frac{1}{2}}$$

Height Adjustment

Regardless of whether UAV 112 is using SFO, SIN or ORB track modes, the height of UAV 112 may be adjusted to maintain target track. Height adjustment may be done using a gradient-descent law to minimize the cost function $$J = 2 \frac{r_{target}^2}{|r_{SM}|^2}$$

with respect to h. As noted above $$r_{SM} = \min(r_h, r_v) \times \frac{h}{I(3)}.$$

Then, $$\dot{h} = \gamma \frac{\delta J}{\delta h}$$

where γ is the gain of the gradient scheme.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method comprising:
   identifying at least one coordinate of a footprint of a sensor tracking a target, wherein the sensor is equipped on an unmanned aerial vehicle;
   determining if the target will leave a field of view of the sensor; and
   employing a track mode selected from a plurality of track modes based on a first speed of the target and a second speed of the unmanned aerial vehicle;
   causing the unmanned aerial vehicle to fly in the employed track mode to keep the target in the field of view of the sensor.

2. The method of claim 1, wherein the track mode comprises a straight following of the target.

3. The method of claim 1, wherein the track mode comprises flying in the shape of a sinusoid.

4. The method of claim 1, wherein the track mode comprises flying orbits around the target.

5. The method of claim 4, wherein the orbits are adjustable.

6. The method of claim 1, wherein the track mode comprises flying to at least one waypoint.

7. The method of claim 5, wherein the orbits are adjusted if the first speed of the target increases.

8. The method of claim 1, wherein employing the track mode selected from the plurality of track modes is further based on at least one limitation of the unmanned aerial vehicle.

9. A system comprising:
   a communication interface;
   a processing unit;
   data storage; and
   program logic stored in the data storage and executable by the processing unit to (i) identify at least one coordinate of a footprint of a sensor tracking a target, wherein the sensor is equipped on an unmanned aerial vehicle; (ii) determine if the target will leave a field of view of the sensor; iii) employ a track mode selected from a plurality of track modes based on a first speed of the target and a second speed of the unmanned aerial vehicle; and (iv) cause the unmanned aerial vehicle to fly in the employed track mode to maintain the target in the field of view of the sensor.

10. The system of claim 9, wherein the track mode comprises a straight following of the target.

11. The system of claim 9, wherein the track mode comprises flying in the shape of a sinusoid.

12. The system of claim 9, wherein the track mode comprises flying orbits around the target.

13. The system of claim 12, wherein the orbits are adjustable.

14. The system of claim 9, wherein the track mode comprises flying to at least one waypoint.

15. The system of claim 13, wherein the program logic is further executable to adjust the orbits if the first speed of the target increases.

16. The system of claim 9, wherein the program logic is further arranged to employ the track mode selected from the plurality of track modes based on at least one limitation of the unmanned aerial vehicle.

17. A method comprising:
   determining a position of a target relative to the center of a sensor footprint;
   determining the distance from the center of the sensor footprint to a side of the sensor footprint that is closest to the target;
   determining a first speed of the target;
   determining a second speed of an unmanned aerial vehicle;
   employing a track mode selected from a plurality of track modes based on the first speed of the target and the second speed of the unmanned aerial vehicle; and
   causing the unmanned aerial vehicle to fly in the employed track mode to maintain the target within a field of view of the sensor.

18. The method of claim 17, further comprising causing the unmanned aerial vehicle to fly at a height in which the target will remain in the field of view of the sensor.

19. The method of claim 17, further comprising causing the unmanned aerial vehicle to fly to at least one waypoint.

20. The method of claim 17, wherein employing the track mode selected from the plurality of track modes is further based on the stall speed of the unmanned aerial vehicle.

* * * * *